US012662280B2

(12) United States Patent
Bonardi

(10) Patent No.: US 12,662,280 B2
(45) Date of Patent: Jun. 23, 2026

(54) CAROUSEL LABELING MACHINE

(71) Applicant: P.E. LABELLERS S.P.A., Porto Mantovano (IT)

(72) Inventor: Luca Bonardi, San Giorgio Bigarello (IT)

(73) Assignee: P.E. LABELLERS S.P.A., Porto Mantovano (IT)

( * ) Notice: Subject to any disclaimer, the term of this patent is extended or adjusted under 35 U.S.C. 154(b) by 191 days.

(21) Appl. No.: 18/274,001

(22) PCT Filed: Feb. 10, 2022

(86) PCT No.: PCT/EP2022/053258

§ 371 (c)(1),
(2) Date: Jul. 25, 2023

(87) PCT Pub. No.: WO2022/179858

PCT Pub. Date: Sep. 1, 2022

(65) Prior Publication Data

US 2024/0425219 A1 Dec. 26, 2024

(30) Foreign Application Priority Data

Feb. 23, 2021 (IT) ........................ 102021000004121

(51) Int. Cl.

| | |
|---|---|
| ***B65C 9/00*** | (2006.01) |
| ***B25B 1/18*** | (2006.01) |
| ***B65C 3/06*** | (2006.01) |

(52) U.S. Cl.
CPC .............. *B65C 9/0062* (2013.01); *B25B 1/18* (2013.01); *B65C 3/06* (2013.01)

(58) Field of Classification Search
CPC ................................ B65C 9/0062; B25B 1/18
See application file for complete search history.

(56) References Cited

U.S. PATENT DOCUMENTS 3,063,708 A * 11/1962 Wollenhaupt ............. B25B 1/24 425/451.2
2005/0034423 A1* 2/2005 Sindermann .......... B65C 9/0062 53/136.1

(Continued)

FOREIGN PATENT DOCUMENTS

| | | |
|---|---|---|
| JP | 2014520731 A | 8/2014 |
| WO | 2013/007317 A1 | 1/2013 |
| WO | 2013/131587 A1 | 9/2013 |

OTHER PUBLICATIONS

International Search Report and Written Opinion issued Oct. 7, 2021 which pertains to PCT Patent Application No. PCT/EP2022/053258, filed Feb. 10, 2022. 8 pages.

*Primary Examiner* — Philip C Tucker
*Assistant Examiner* — John Blades
(74) *Attorney, Agent, or Firm* — THOMPSON HINE LLP

(57) ABSTRACT

A carousel labeling machine, which comprises a carousel for conveying the containers to be labeled, which is provided with a frame which supports at least one attachment point, which can be engaged by at least one carriage for supporting a labeling station, and which is provided with locking elements adapted to cooperate with engagement elements supported by the carriage in order to perform the locking of the carriage to the frame in a position adapted to allow the application of the labels on the containers that are present on the carousel by the labeling station mounted on the carriage; the engagement elements comprise at least one coupling device supported by the carriage, while the locking elements comprise at least one pair of retention elements, which can move with respect to each other in order to effect the clamping of the coupling device between the retention elements.

14 Claims, 11 Drawing Sheets

(56) References Cited

U.S. PATENT DOCUMENTS

| | | | | |
|---|---|---|---|---|
| 2013/0319596 | A1* | 12/2013 | Cattabriga | B65C 9/02 156/60 |
| 2014/0124646 | A1* | 5/2014 | Cordiol | B65C 9/0062 248/646 |
| 2015/0020978 | A1* | 1/2015 | Cordioli | B65C 9/08 156/538 |
| 2016/0167820 | A1 | 6/2016 | Ugolini et al. | |

* cited by examiner

CAROUSEL LABELING MACHINE

The present invention relates to a carousel labeling machine.

Carousel labeling machines are known which can be fitted, at the peripheral region of the carousel, with labeling stations that differ from each other, such as, for example, stations that apply the labels in different areas of the containers or which use pre-glued labels or which are provided with devices for applying hot or cold glue to the labels, thus achieving a high versatility of the machine.

In these labeling machines, the labeling stations are, typically, supported by respective carriages provided with wheels which are positioned in proximity to the frame of the carousel and are fixed thereto at attachment points, which are specially adapted to lock these carriages.

Currently, the locking of the carriage to the corresponding attachment point is achieved with devices of various types.

One known solution involves a locking element that can be maneuvered manually by the operator using a crank positioned at the rear of the carriage.

This solution, while having the advantage of being very simple, does however require a manual intervention by the operator.

More complex solutions are also known wherein an electronically-controlled mechanical actuator lifts the carriage from below, while a pneumatic device presses down on the carriage from above, thus causing the locking thereof with respect to the frame of the carousel.

This solution, in addition to having a certain lateral space occupation with respect to the frame of the carousel, does not allow precise control of the locking of the carriage and of its positioning at the correct height with respect to the plane of the carousel.

The aim of the present invention is to provide a carousel labeling machine that is capable of improving the known art in one or more of the above-mentioned aspects.

Within this aim, an object of the invention is to provide a carousel labeling machine that makes it possible to fix the carriages for supporting the labeling stations to the peripheral region, with the certainty that they are positioned at the correct height with respect to the plane of the carousel and with the assurance of an adequately secure locking.

Another object of the invention is to provide a carousel labeling machine in which the points adapted for fixing the carriages do not protrude excessively with respect to the frame of the carousel, being substantially contained inside the maximum perimetric space occupation of the frame.

Another object of the present invention is to provide a labeling machine that makes it possible to fix the carriages to the frame of the carousel with the maximum of precision and using means that are extremely simple.

Another object of the present invention is to provide a carousel labeling machine that can offer the widest guarantees of reliability and safety in operation.

Another object of the invention is to provide a carousel labeling machine that allows optimal control of the positioning and of the locking of the carriages.

A still further object of the present invention is to overcome the drawbacks of the background art in a manner that is alternative to any existing solutions.

Another object of the invention is to provide a carousel labeling machine that is relatively easy to provide, so that it can be produced at low cost.

This aim and these and other objects which will become more apparent hereinafter are achieved by a carousel labeling machine according to claim 1, optionally provided with one or more of the characteristics of the dependent claims.

Further characteristics and advantages of the invention will become more apparent from the description of a preferred, but not exclusive, embodiment of the carousel labeling machine according to the invention, which is illustrated by way of non-limiting example in the accompanying drawings wherein.

Figure 1:
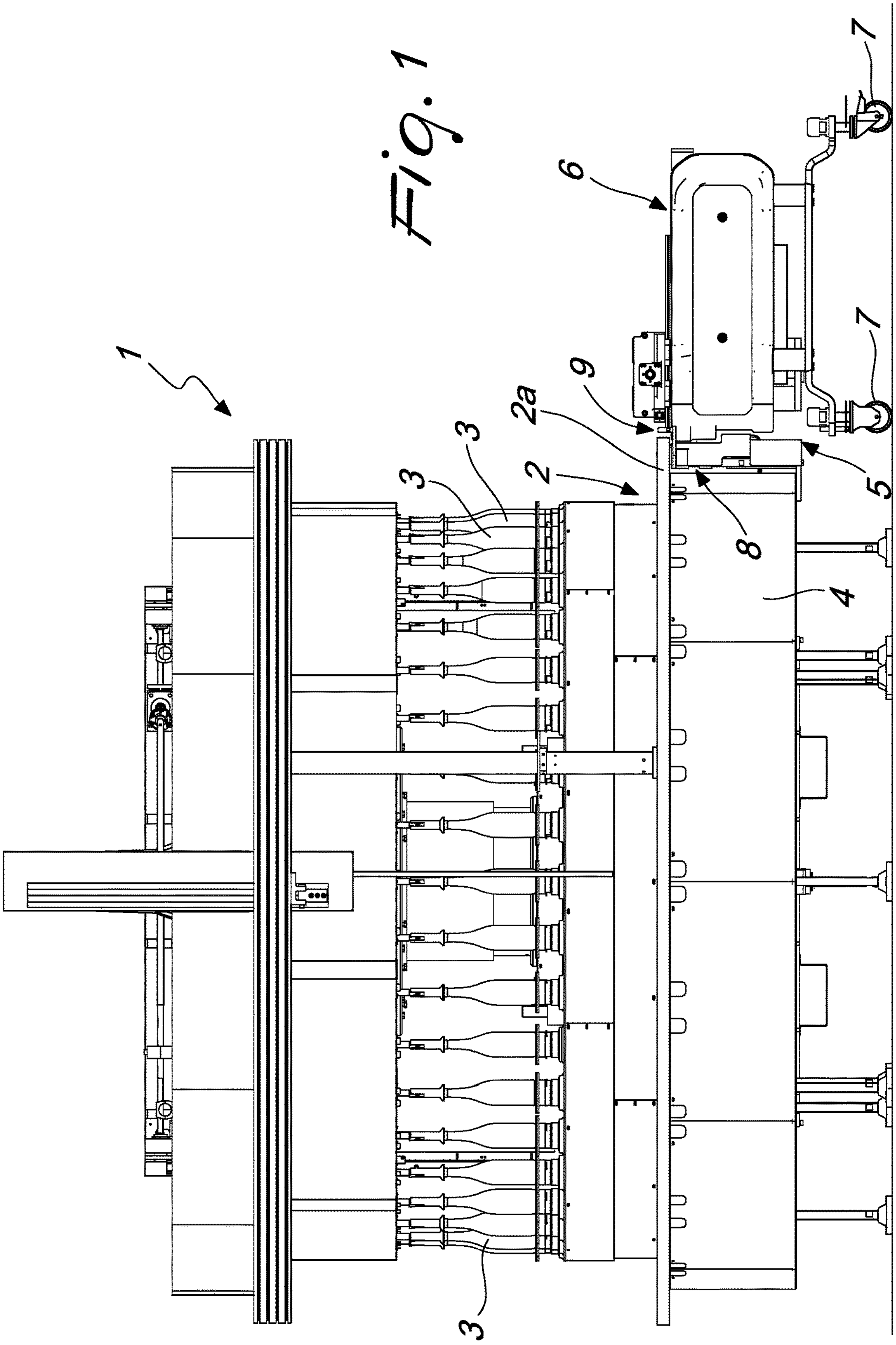
FIG. 1 is a side view of the carousel labeling machine according to the invention with a carriage for supporting a labeling station in the condition in which it is locked to an attachment point present on the carousel of the machine.
Figure 2:
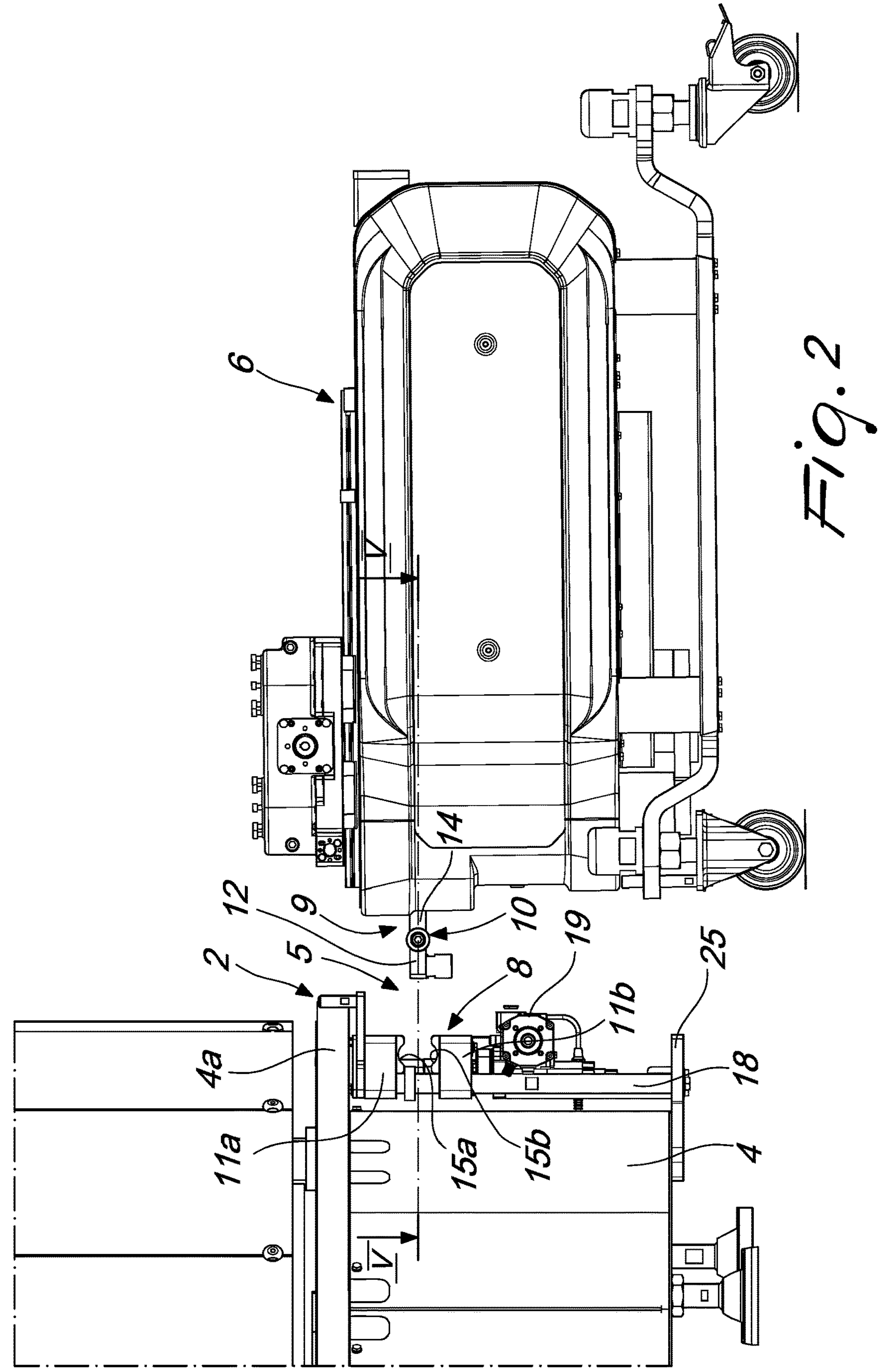
FIG. 2 is a side view of the carriage approaching the attachment point of a carousel.
Figure 3:
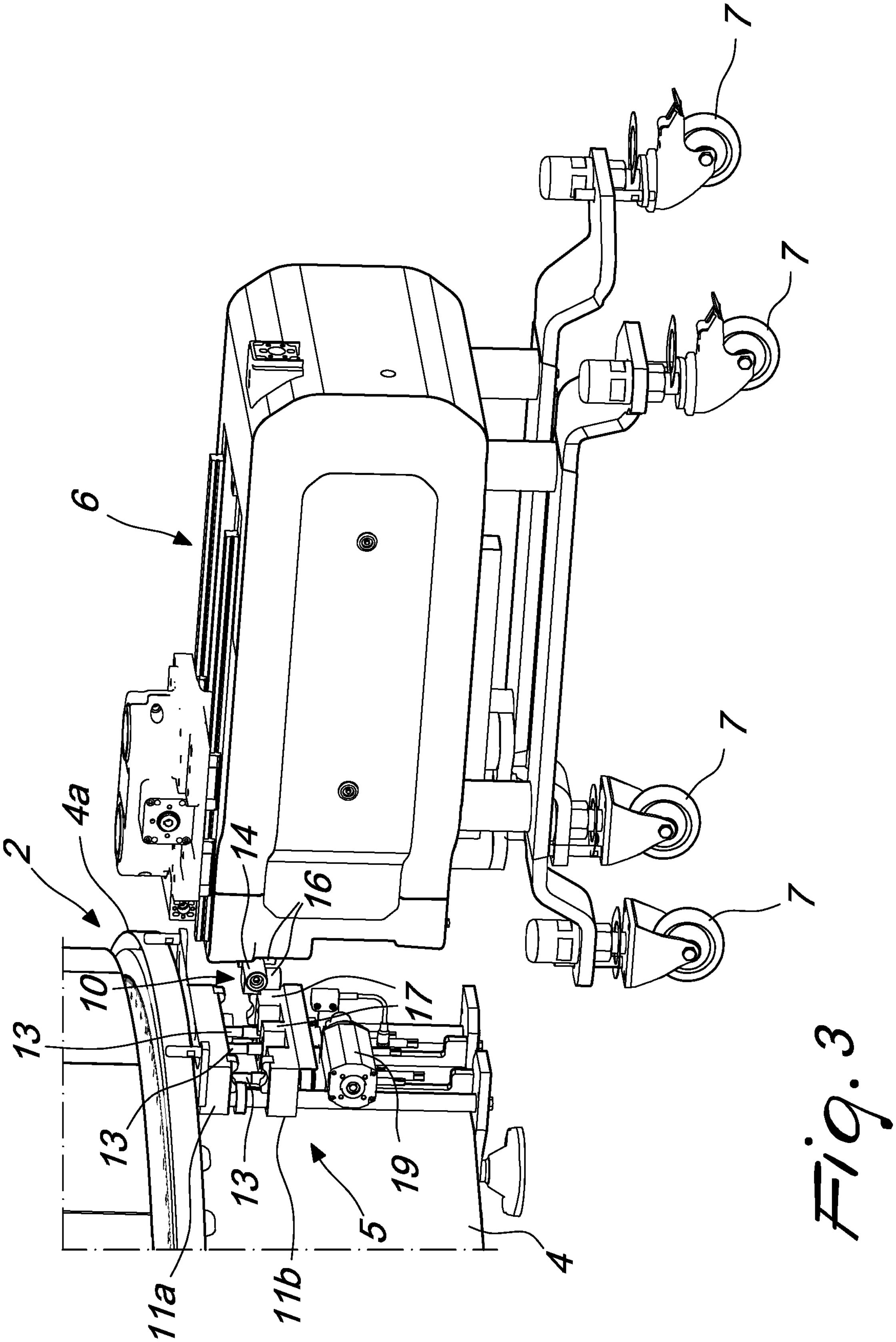
FIG. 3 is a perspective view of the carriage approaching the attachment point.
Figure 4:
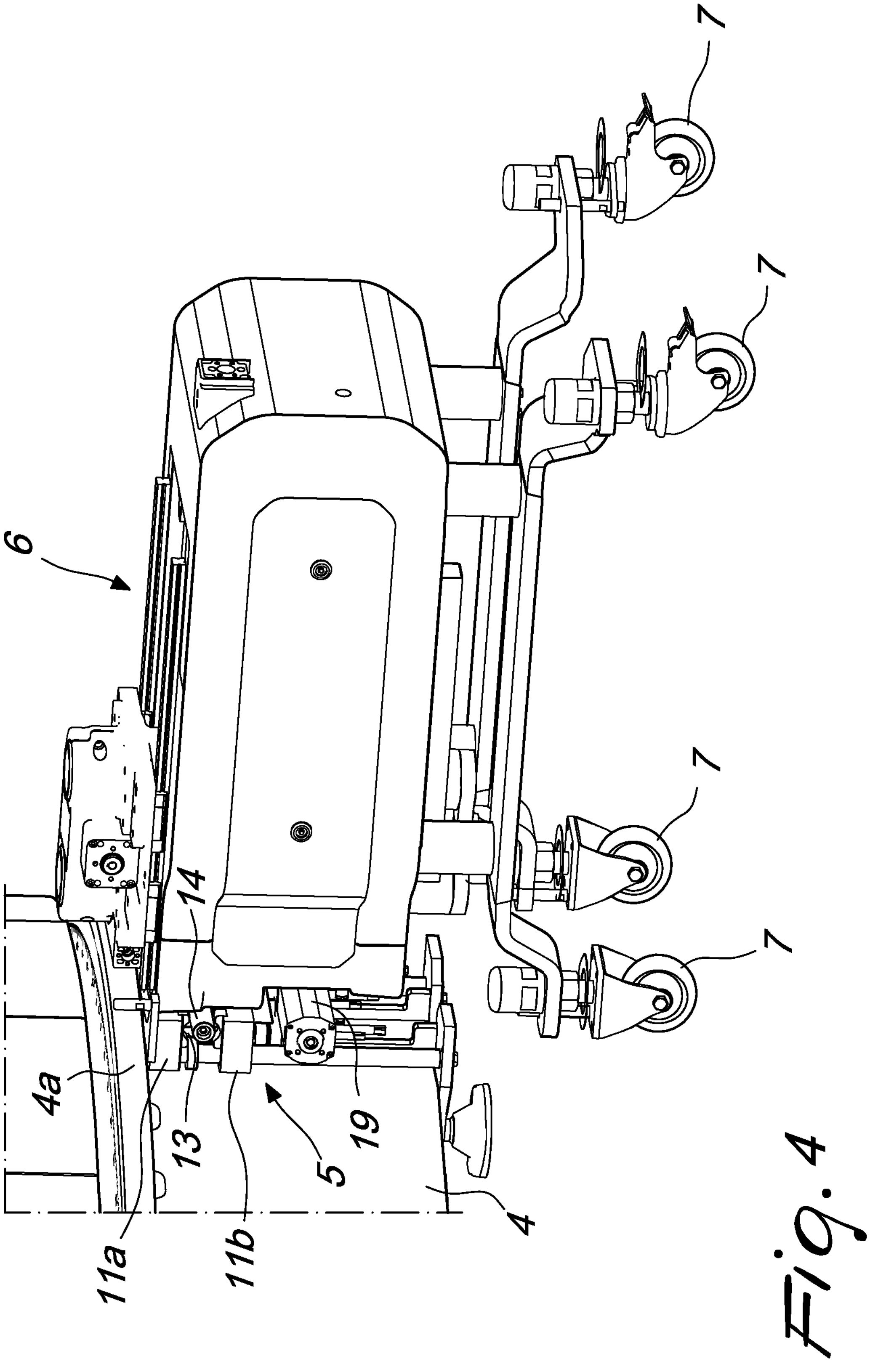
FIG. 4 is a perspective view of the carriage in the situation in which it has been brought to the attachment point but is not yet locked.
Figure 5:
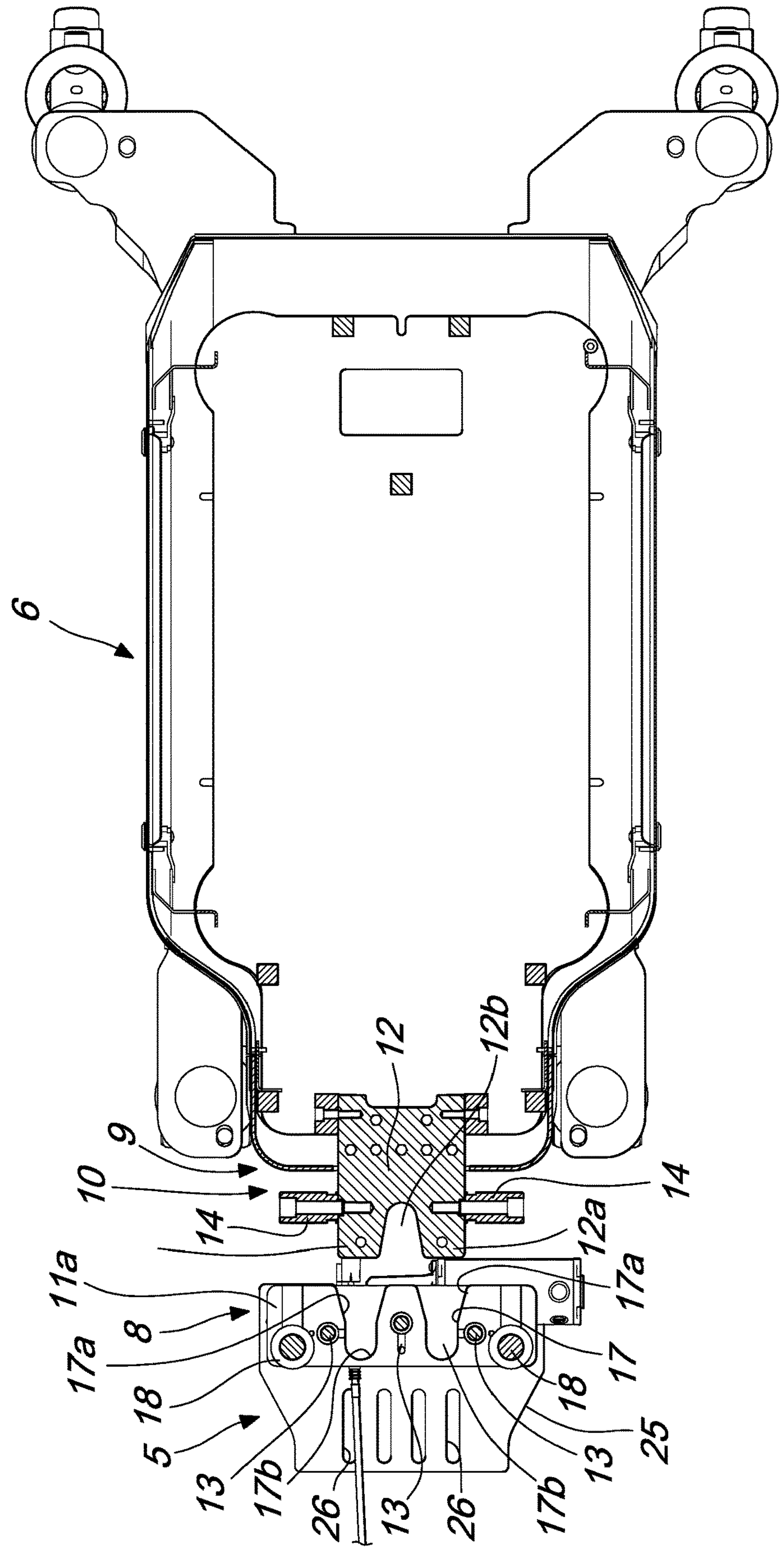
FIG. 5 is a cross-sectional view taken along the line V-V of FIG. 2, with parts omitted for the sake of simplicity.
Figure 6:
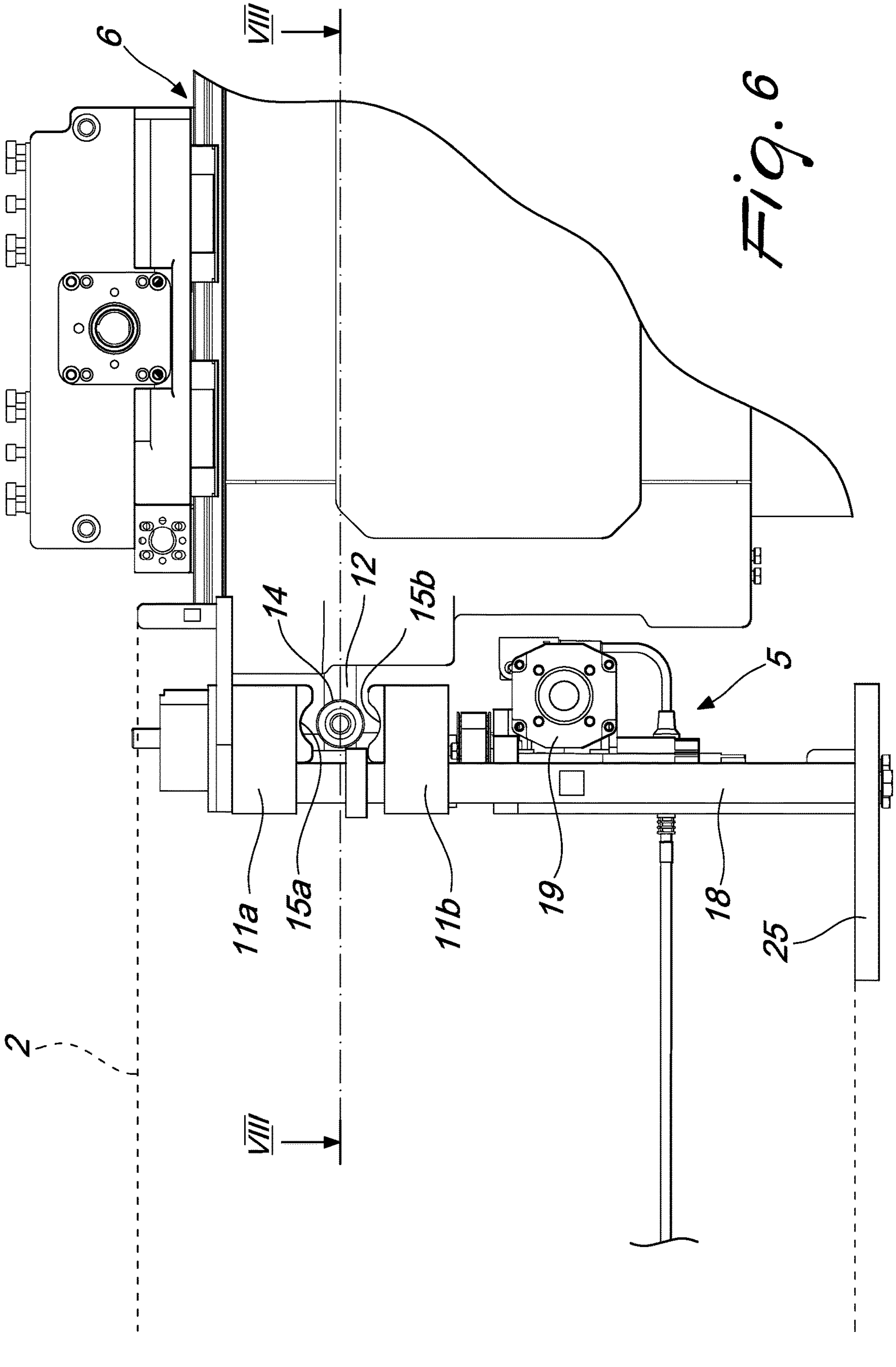
FIG. 6 is a side view partially showing the carriage in the situation in which it has been brought to the attachment point but is not yet locked, with the carousel shown as transparent.
Figure 7:
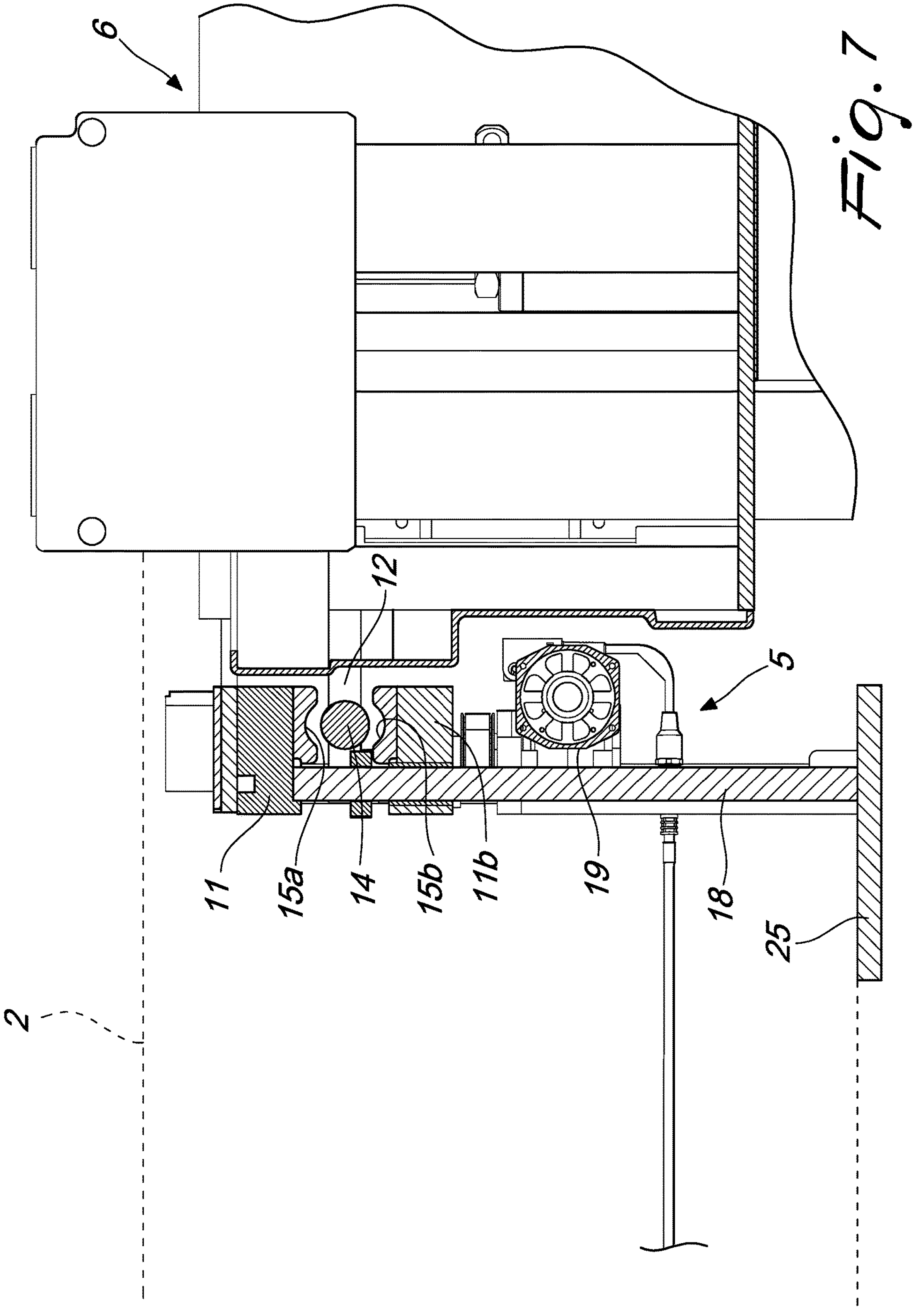
FIG. 7 is a cross-sectional view taken along a longitudinal plane, partially showing the carriage in the situation of FIG. 6, with the carousel shown as transparent.
Figure 8:
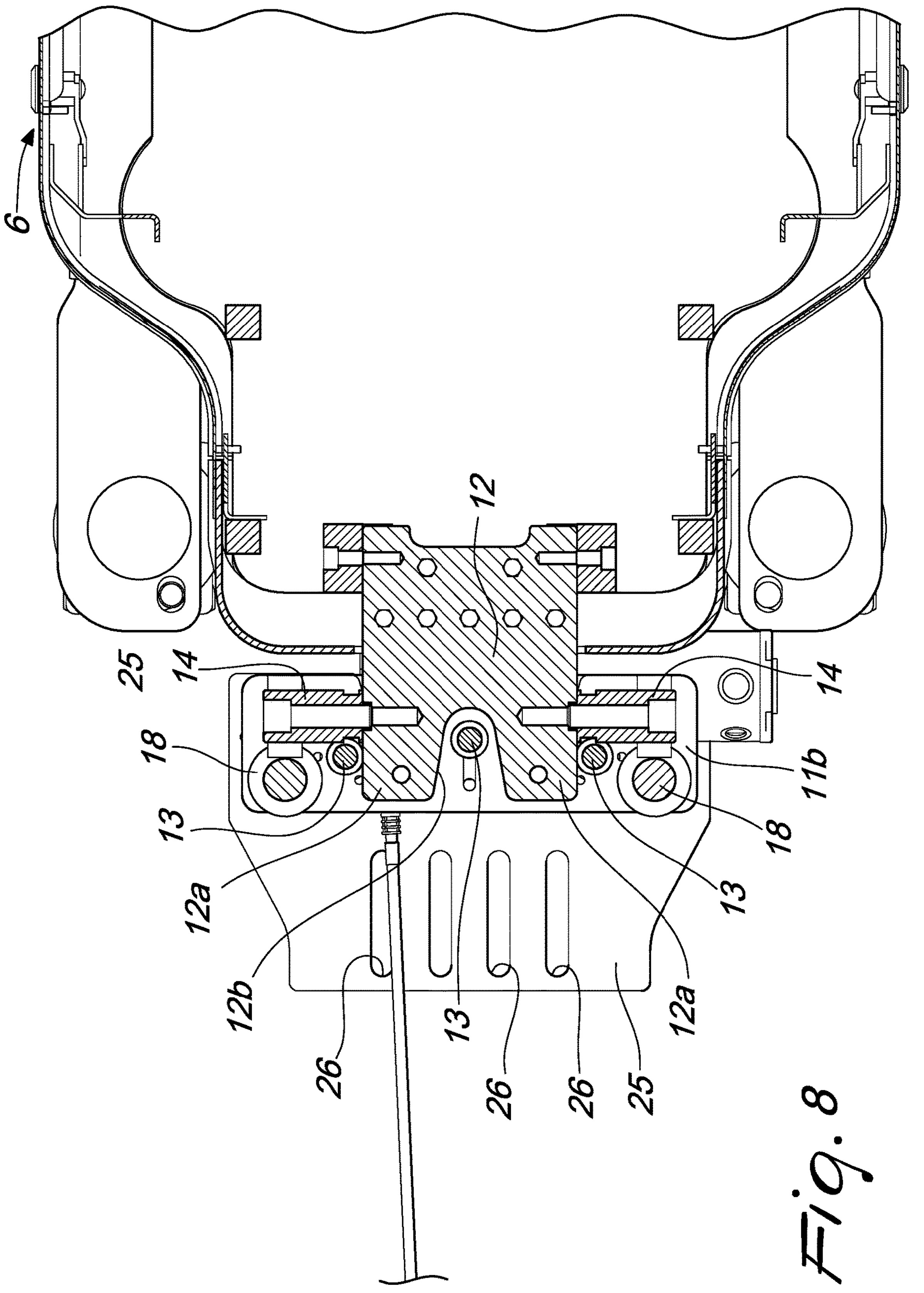
FIG. 8 is a cross-sectional view taken along the line VIII-VIII of FIG. 6, with parts omitted for the sake of simplicity.
Figure 9:
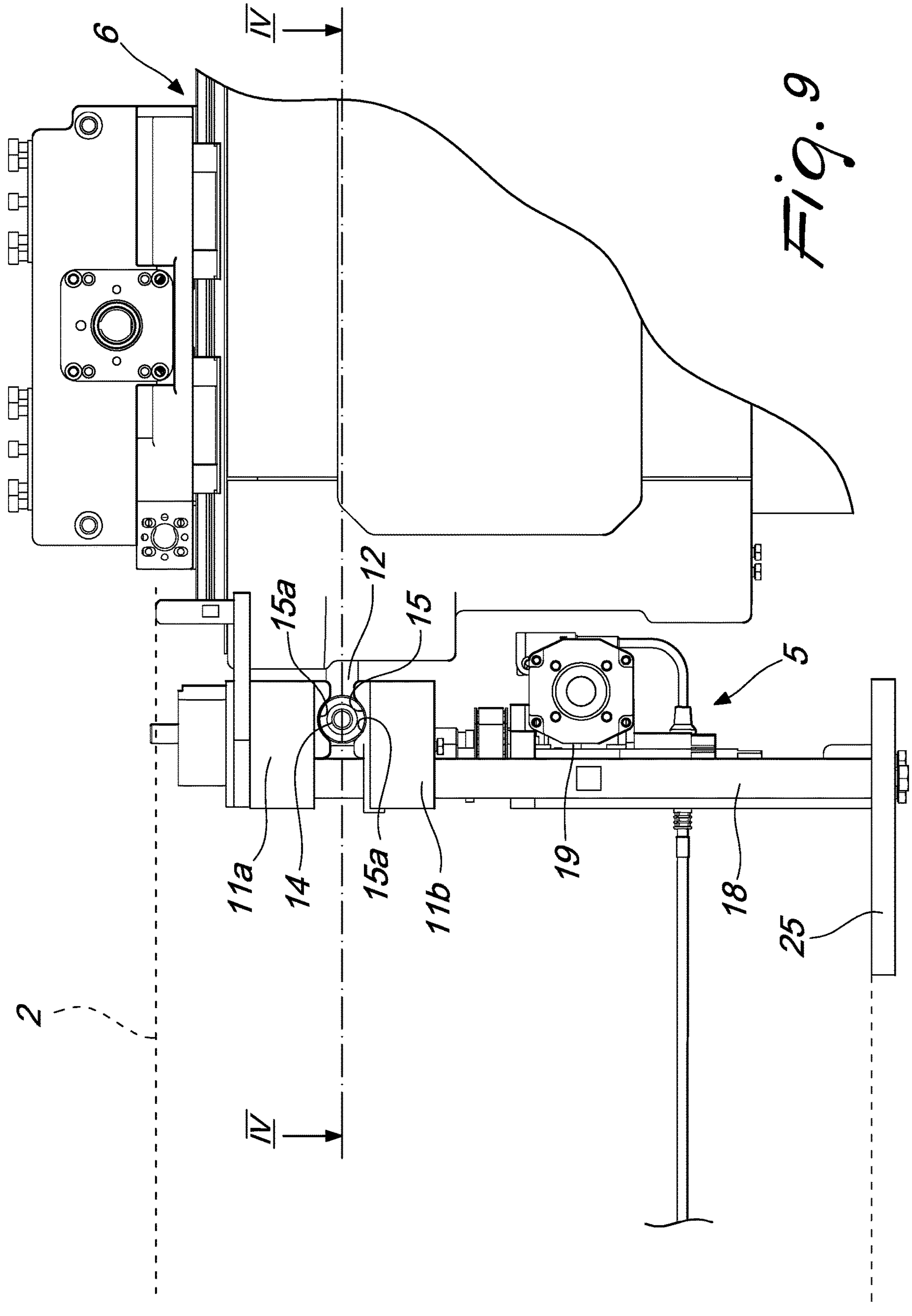
FIG. 9 is a side view partially showing the carriage locked to the attachment point, with the carousel shown as transparent.
Figure 10:
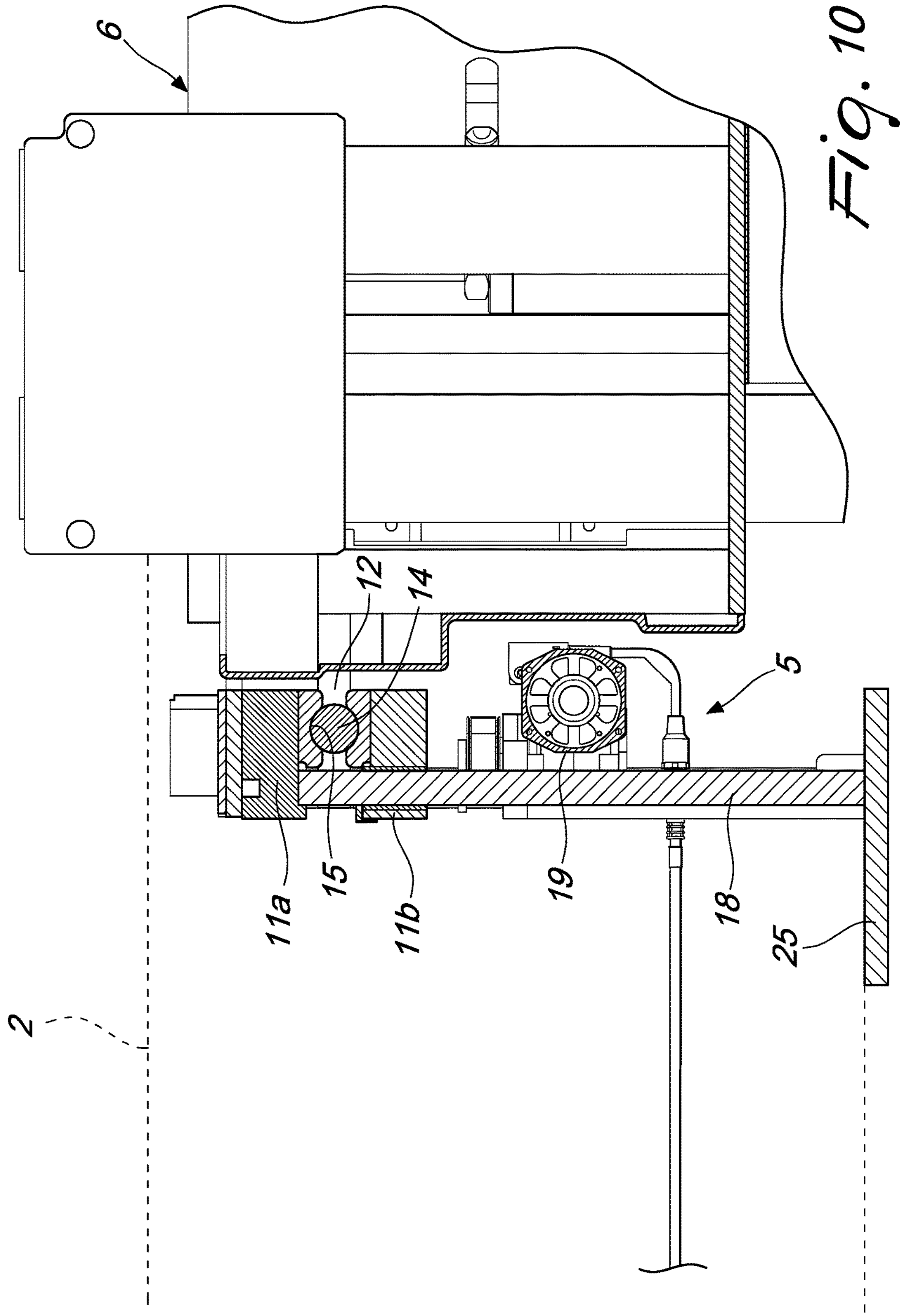
FIG. 10 is a cross-sectional view taken along a longitudinal plane of the carriage in the situation of FIG. 9.
Figure 11:
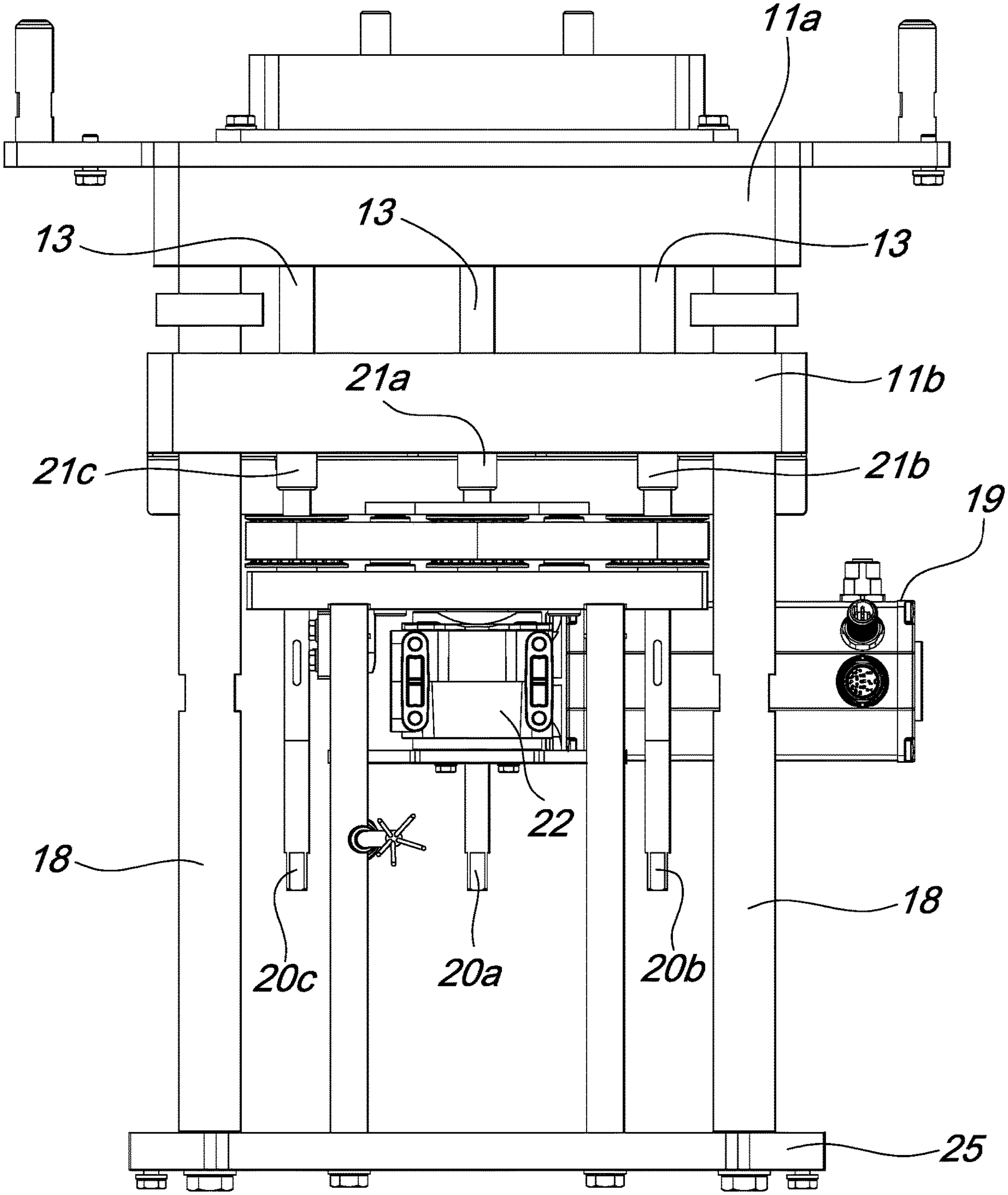
FIG. 11 is a rear view, with respect to the position of the carriage, of an attachment point.

With reference to the figures, the carousel labeling machine according to the invention, generally designated by the reference numeral 1, comprises a carousel 2 for conveying the containers 3 to be labeled, which is provided with a frame 4 which supports, at its peripheral region, at least one attachment point 5 for at least one respective carriage 6 for supporting a labeling station, which is per se known and not shown for the sake of simplicity.

The carriage 6 is fitted with wheels 7, which make it possible for it to be brought to the attachment point 5 for its subsequent locking to the frame 4 of the carousel 2.

Conveniently, around the perimeter of the frame 6 there can be a plurality of attachment points 5, each of which can be detachably engaged by a respective carriage 6. Conveniently, the attachment points 5 that are present around the carousel 2 are structurally identical to each other, in order to allow the interchangeability of the carriages 6 between the various attachment points 5.

In particular, the or each attachment point 5 is provided with locking means 8 which, operating in cooperation with engagement means 9 supported by the carriage 6, ensure the locking of the corresponding carriage to the frame 4 of the carousel 2 in a position adapted to enable the labeling station supported by the carriage 6 to positively apply the labels on the containers in transit on the carousel 2.

According to the invention, the engagement means 9 comprise at least one coupling device 10 supported by the carriage 6, while the locking means 8 comprise, in turn, at least one pair of retention elements 11*a*, 11*b*, which can move with respect to each other in order to effect the clamping of the coupling device 10 between the retention elements 11*a*, 11*b*, so as to obtain their locking.

In particular, such retention elements 11*a*, 11*b* can be moved away from each other, so as to allow the insertion or the withdrawal of the coupling device 10 into or out of the area comprised between the two retention elements 11*a*, 11*b*, or toward each other, in order to provide in this way the clamping of the coupling device 10 between the retention elements, as will be better explained below.

More specifically, the retention elements 11*a*, 11*b* are provided by respective blocks and comprise, advantageously, an upper retention element, corresponding to the one indicated in the figures with 11*a*, and a lower retention element, which faces the upper retention element 11*a* and corresponds to the one indicated with 11*b* in the figures.

Conveniently, the upper retention element 11*a* is fixed to the frame 4 of the carousel 2 and is positioned at a preset height with respect to the upper edge 4*a* of the frame. Preferably, the upper retention element 11*a* is arranged directly below the upper edge 4*a* of the carousel 2.

The lower retention element 11*b* can, instead, be actuated in motion, with respect to the upper retention element 11*a*, along a substantially vertical direction, using electromechanical movement means, better detailed below, so as to enable the mutual approach or spacing apart of the retention elements 11*a*, 11*b*.

Means are also provided for centering the coupling device 10 with respect to the retention elements 11*a*, 11*b*, which make it possible not only to ensure the correct positioning of the carriage 6 and, therefore, of the corresponding labeling station with respect to the carousel 2 but also to ensure that the retention elements 11*a*, 11*b* can correctly perform their function of locking the carriage 6.

Advantageously, the coupling device 10 comprises a substantially horizontal engagement plate 12, which protrudes from the front of the carriage 6, the part designed to be directed toward the frame 4.

In particular, the engagement plate 12 is structured so that it can be inserted between the retention elements 11*a*, 11*b* and as a consequence be clamped between those retention elements.

Conveniently, the above-mentioned means for centering comprise substantially vertical locator pins 13, which are supported by the frame 4 of the carousel at the attachment point 5 and which are arranged laterally mutually spaced apart, along a direction that is substantially parallel to the transverse axis of the carriage 6.

The engagement plate 12 is, in turn, shaped in a front region so as to define at least one pair of protrusions 12*a*, which can be inserted between the locator pins 13, so as to ensure the correct radial positioning of the carriage 6 with respect to the carousel 2.

Advantageously, the protrusions 12*a* are separated by at least one recess 12*b* which is designed to receive therein at least one of the locator pins 13, when the carriage 6 is brought to the carousel 2 so as to insert the engagement plate 12 between the retention elements 11*a*, 11*b*.

Conveniently, the carriage 6 is further provided with a pair of engagement pins 14, which are fixed to the engagement plate 12 and which make it possible to prevent the disengagement of the engagement plate 12 from the attachment point 5, when the latter is clamped between the retention elements 11*a*, 11*b*.

In particular, such engagement pins 14 are arranged substantially mutually coaxially along a direction that is substantially parallel to the transverse axis to the carriage 6 and protrude laterally on mutually opposite sides with respect to the engagement plate 12.

For each one of the engagement pins 14, the retention elements 11*a*, 11*b* define a respective accommodation seat 15 which is shaped correspondingly and, more specifically, each accommodation seat 15 is advantageously defined, at least partly, on one of the retention elements 11*a*, 11*b* and, at least partly, on the other one of the retention elements 11*a*, 11*b*. The part of the accommodation seat 15 that is defined on the upper retention element 11*a* is indicated in the figures with 15*a*, while the part defined on the lower retention element 11*b* is indicated with 15*b*.

Advantageously, in order to ensure a correct centering of the engagement pins 14 with respect to the retention elements 11*a*, 11*b*, the carriage 6 is provided with at least one pair of locator tabs 16, which protrude substantially at right angles from a face of the engagement plate 12 and can be inserted in respective engagement seats 17, which are correspondingly defined on one of the retention elements 11*a*, 11*b*.

Preferably, the locator tabs 16 are mutually laterally adjacent along a direction that is substantially parallel to the transverse axis of the carriage 6 and protrude downward from the lower face of the engagement plate 12. In this case, the engagement seats 17 are defined in the lower retention element 11*b*.

Advantageously, the locator tabs 16 are arranged in a front region with respect to the engagement pins 14, in the direction of movement of the carriage 6 that brings it closer to the frame 4 of the carousel 2, and, more specifically, they are arranged substantially at the protrusions 12*a* of the engagement plate 12.

Conveniently, the engagement seats 17 have two portions in mutual communication, respectively an access portion 17*a*, arranged on their side that is intended to be directed toward the carriage 6, and an accommodation portion 17*b*, in which the respective locator tab 16 is designed to settle and which is shaped correspondingly to the latter.

Advantageously, the access portion 17*a* is provided with tapered guide walls in order to facilitate the insertion of the locator tabs 16 in the accommodation portion 17*b* of the corresponding engagement seat 17.

Conveniently, the lower retention element 11*a* can slide along substantially vertically extended guides 18, to the upper end of which the upper retention element 11*a* is, advantageously, fixed, and the above-mentioned electromechanical movement means comprise an electric motor 19 which actuates at least one worm screw which is engaged by a respective female thread which is integral with the lower retention element 11*b*.

More specifically, the electric motor 19 is connected, through a reduction gear unit 22, to a central worm screw 20*a*, with a substantially vertical axis, which engages a corresponding female thread 21*a*, which is integral with the lower retention element 11*b* and which, by way of a connection of the belt and pinion type, transmits its rotary motion to another two worm screws 20*b* and 20*c*, which are arranged substantially parallel and side by side with respect to the central worm screw 20*a* and which, in turn, engage, by screwing, corresponding female threads 21*b* and 21*c*, which are also integral with the lower retention element 11*b*.

Conveniently, the worm screws 20*a*, 20*b*, 20*c* pass through the lower retention element 11*b* and are supported so that they can rotate, at an upper end thereof, by the upper retention element 11*a*.

It should be noted that the locator pins 13 can be provided, in practice, by the portion of the worm screws 20*a*, 20*b*, 20*c* that is comprised between the retention elements 11*a*, 11*b*.

It must also be said that, preferably, the electric motor 19 is a motor of the brushless type, optionally drivable using a special electronic controller, so as to ensure the certainty of the positioning of the lower retention element 11*a*, along the guides 18, and also to ensure a precise tightening torque on the retention elements 11*a*, 11*b*.

It must be noted that the retention elements 11*a*, 11*b* and, more generally, the locking means 8 of the attachment points 5, are, conveniently, contained within the external perimetric space occupation of the frame 4.

More specifically, the upper edge 4*a* of the frame 4 protrudes outward with respect to the side wall of the frame 4 on which each attachment point is located and each attachment point 5 is contained in the space underneath the upper edge 4*a* of the frame 4, so as not to extend beyond the radial space occupation of the frame 4.

Advantageously, the electromechanical movement means, as well as the guides 18, are supported by a support plate 25, which protrudes laterally from a side wall of the frame 4 of the carousel 2 and is fixed to the frame 4 of the carousel 2 using screws, not shown, inserted through slots 26, defined in the support plate 25, so as to permit the adjustment thereof in a radial direction with respect to the carousel 2.

The operation of the machine, according to the invention, is the following.

With the retention elements 11*a*, 11*b* mutually spaced apart, the operator pushes the carriage 6 toward the attachment point 5, so as to slip the engagement plate 12 between the retention elements 11*a*, 11*b*, thus inserting the protrusions 12*a* of the engagement plate 12 between the locator pins 13 and introducing the locator tabs 16 into the engagement seats 17.

When the locator tabs 16 become lodged inside the accommodation portion 17*b* of the corresponding engagement seats 17, the carriage 6 stops.

In this situation, the electromechanical movement means are activated and, in particular, the electric motor 19 is activated, so as to effect the approach of the lower retention element 11*b* toward the upper retention element 11*a*, until the engagement plate 12 is clamped between the retention elements 11*a*, 11*b* and the engagement pins 14 are lodged inside both parts 15*a*, 15*b* of the corresponding accommodation seats 15 defined on the retention elements 11*a*, 11*b*, so as to ensure the locking of the carriage 6 to the frame 4 of the carousel.

In practice it has been found that the invention fully achieves the intended aim and objects and, in particular, it is emphasized that the machine according to the invention is capable of making possible not only a valid locking of the carriages that support the labeling stations to the frame of the carousel, but also a correct positioning of the carriages themselves with respect to the carousel, using locking means contained within the external perimetric space occupation of the carousel.

The invention thus conceived is susceptible of numerous modifications and variations, all of which are within the scope of the appended claims. Moreover, all the details may be substituted by other, technically equivalent elements.

In practice the materials employed, provided they are compatible with the specific use, and the contingent dimensions and shapes, may be any according to requirements and to the state of the art.

The disclosures in Italian Patent Application No. 102021000004121 from which this application claims priority are incorporated herein by reference.

Where technical features mentioned in any claim are followed by reference signs, those reference signs have been included for the sole purpose of increasing the intelligibility of the claims and accordingly, such reference signs do not have any limiting effect on the interpretation of each element identified by way of example by such reference signs.

The invention claimed is:

1. A carousel labeling machine, comprising: a carousel for conveying containers to be labeled and at least one carriage, the carousel being provided with a frame which supports, at a peripheral region thereof, at least one attachment point, which is configured to be engaged detachably by said carriage for supporting a labeling station, and which is provided with locking means adapted to cooperate with engagement means supported by said carriage in order to perform a locking of said carriage to said frame in a position adapted to allow application of the labels on the containers that are present on said carousel by the labeling station mounted on said carriage, wherein said engagement means comprise at least one coupling device supported by said carriage, said locking means comprising at least one pair of retention elements, which are configured to move with respect to each other in order to effect a clamping of said at least one coupling device between said retention elements, means being provided for centering said at least one coupling device with respect to said retention elements;

wherein said at least one pair of retention elements comprise an upper retention element, which is fixed to said frame and is arranged at a preset height with respect to an upper edge of said frame, and a lower retention element, which faces said upper retention element and can be actuated in motion, by electromechanical movement means, with respect to said upper retention element, along a substantially vertical direction.

2. The machine according to claim 1, wherein said at least one coupling device comprises a substantially horizontal engagement plate which protrudes from a side of said carriage that is designed to be directed toward said frame, said engagement plate being insertable between said retention elements.

3. The machine according to claim 2, wherein said centering means comprise substantially vertical locator pins which are supported by said frame and are laterally mutually spaced apart, said engagement plate being shaped in a front region so as to define at least one pair of protrusions which are configured to be inserted between said locator pins.

4. The machine according to claim 3, wherein said protrusions are separated by at least one recess which is designed to accommodate at least one of said locator pins.

5. The machine according to claim 2, wherein said carriage comprises a pair of engagement pins which are fixed to said engagement plate and are arranged mutually substantially coaxially along a direction that is substantially transverse to said carriage, said engagement pins protruding laterally on mutually opposite sides with respect to said engagement plate, said at least one pair of retention elements defining, for each one of said engagement pins, a respective correspondingly-shaped accommodation seat.

6. The machine according to claim 5, wherein each respective correspondingly-shaped accommodation seat is, at least partly, defined on one of said at least one pair of retention elements and, at least partly, on another one of said at least one pair of retention elements.

7. The machine according to claim 2, wherein that said carriage comprises at least one pair of locator tabs, which protrude substantially at right angles from a face of said substantially horizontal engagement plate and are configured to be inserted in respective engagement seats, which are correspondingly defined on one of said at least one pair of retention elements.

8. The machine according to claim 1, wherein said electromechanical movement means comprise an electric motor which actuates at least one worm screw which is engaged by a respective female thread which is integral with said lower retention element.

9. The machine according to claim 8, wherein said electric motor is a motor of the brushless type.

10. The machine according to claim 1, wherein said at least one pair of retention elements are contained within an external perimeter of said frame.

11. A carousel labeling machine, comprising:

a carousel for conveying containers to be labeled; and at least one carriage including a labeling station mounted thereon;

wherein said carousel includes a frame with a peripheral region which supports at least one attachment point that is configured to be engaged detachably by said carriage, wherein said peripheral region includes locking means adapted to cooperate with engagement means supported by said carriage in order to perform a locking of said carriage to said frame in a position adapted to allow application of labels on the containers that are present on said carousel by the labeling station mounted on said carriage;

wherein said engagement means comprise at least one coupling device supported by said carriage;

wherein said locking means comprise an upper retention element, which is fixed to said frame and is arranged at a preset height with respect to an upper edge of said frame, and a lower retention element, which faces said upper retention element and can be actuated in motion, by electromechanical movement means along a substantially vertical direction between an open position and a clamping position relative to said upper retention element;

wherein said at least one coupling device comprises a substantially horizontal engagement plate which protrudes from a side of said carriage that is designed to be directed toward said frame, said engagement plate carrying a pair of engagement pins that are fixed to said engagement plate and that extend from opposite sides of said engagement plate and that are arranged mutually substantially coaxially along a direction that is substantially transverse to said carriage, both said engagement plate and said engagement pins being insertable between said upper retention element and said lower retention element when said lower retention element is in the open position;

wherein said upper and lower retention elements are configured to engage and clamp both the said engagement plate and said engagement pins when said lower retention element moves vertically upward into the clamping position.

12. The carousel labeling machine of claim 11, wherein said upper and lower retention elements are configured to define, for each one of said engagement pins, a respective correspondingly-shaped accommodation seat for clamping said engagement pins when said lower retention element is in the clamping position.

13. The machine according to claim 11, wherein that said carriage comprises at least one pair of locator tabs, which protrude substantially at right angles from a face of said substantially horizontal engagement plate and are configured to be inserted in respective engagement seats, which are correspondingly defined on one of said upper and lower retention elements.

14. The machine according to 13, further comprising:

substantially vertical locator pins which are supported by said frame, between said upper retention element and said lower retention element, and are laterally spaced apart, said engagement plate being shaped in a front region so as to define at least one pair of distal end protrusions which are configured to be inserted between said locator pins for centering of said at least one coupling device with respect to said upper and lower retention elements.

* * * * *